United States Patent [19]

Takagaki

[11] Patent Number: 4,649,179

[45] Date of Patent: Mar. 10, 1987

[54] POLYACETAL RESIN COMPOSITION

[75] Inventor: Hitohisa Takagaki, Fuji, Japan

[73] Assignee: Polyplastics Co., Ltd., Osaka, Japan

[21] Appl. No.: 757,589

[22] Filed: Jul. 22, 1985

[30] Foreign Application Priority Data

Jul. 24, 1984 [JP] Japan ................... 59-153668

[51] Int. Cl.$^4$ .................... C08L 61/02; C08L 67/00
[52] U.S. Cl. .................................. 525/400; 525/398
[58] Field of Search ............... 525/398, 400; 524/593

[56] References Cited

U.S. PATENT DOCUMENTS 4,377,667  3/1983  Sakurai et al. ................... 525/400

FOREIGN PATENT DOCUMENTS 2152590  4/1973  France .
1395629  5/1975  United Kingdom .
1398290  6/1975  United Kingdom .

OTHER PUBLICATIONS

Chemical Abstracts, vol. 83, No. 26, No. 207142g (1975).

Primary Examiner—Theodore E. Pertilla
Attorney, Agent, or Firm—Burns, Doane, Swecker & Mathis

[57] ABSTRACT

A polyacetal resin composition comprises polyacetal and an ester of a fatty acid having 12 or more carbon atoms and a polyalkylene glycol having a polymerization degree of 16 or more and is improved in abrasion resistance, suitable for moulding.

8 Claims, No Drawings

POLYACETAL RESIN COMPOSITION

The present invention relates to polyacetal resin compositions having excellent frictional characteristic in which such excellent properties as surface state, thermal stability, etc., of its molded product are retained in well balanced proportions, without losing workabilities in extrusion and molding and the compositions of this invention are finding preferable applications in a variety of sliding parts, mechanism parts, etc., of, for example, electric equipment, automobiles, fiber making machines, cameras, facsimiles, duplicators, computers and various QA equipments and other sundry goods. Examples of its utilization include mechanism parts of audio or video tape recorder units, tape reels and parts contained in cassettes which slide in contact with tape and keyboard switches of various equipment, etc.

PRIOR ART

As is well known, polyacetal resins have recently been found useful in very wide fields as typical engineering resins excellent in physical characteristics such as mechanical properties, electric characteristics, etc., or chemical characteristics such as chemicals resistance, heat resistance, etc. With expanding fields of application of polyacetal resins, however, their special properties as such materials are called for. As one of such properties, further improvements in frictional characteristic are sometimes required in the fields of sliding parts, mechanism parts, etc., of automobiles, electric products, etc. In answer to this demand, plans to improve the frictional characteristic of polyacetal resin by adding to polyacetal resin various petroleum lubricants, mineral oils, synthetic lubricants, silicon oil, aliphatic alcohols and their esters, fluororesins, molybdenum disulfide and other additives have heretofore been proposed.

PROBLEMS TO BE SOLVED BY THE INVENTION

The inventors have noted, however, that the prior polyacetal composition, made for lubrication, is improved in frictional characteristics. The additives contained therein damage properties for extrusion and mouldability and then decrease mechanical properties and heat stability. When an article moulded from the composition is allowed to stand at a high temperature and at a high humidity, the additives bleed toward the surface thereof and eventually the surface property gets worse. This invention has been realized so as to serve the end of solving such problems, as a result of assiduous studies to obtain polyacetal resin compositions in which such disadvantages are eliminated.

SUMMARY OF THE INVENTION

According to the invention, a polyacetal resin composition comprises polyacetal and an ester of a fatty acid having 12 or more carbon atoms and a polyalkylene glycol having a polymerization degree of 16 or more on the average. It is preferable that the fatty acid have 12 to 22 carbon atoms and the polyalkylene glycol have a polymerization degree of 16 to 200 on the average. The ester may be mono-ester or di-ester.

As the polyacetal resin used according to this invention, either polyoxymethylene-homopolymer or polyacetal-copolymers or terpolymers which consist of oxymethylene chains as the major part.

The fatty acids which are used in producing the fatty acid esters are saturated or unsaturated fatty acids containing 12 or more carbon atoms. Examples of such fatty acids include lauric acid, tridecylic acid, myristic acid, pentadecylic acid, palmitic acid, heptadecylic acid, stearic acid, nonadecanic acid, arachic acid, behenic acid, lignoceric acid, cerotic acid, heptacosanic acid, montanic acid, melissic acid, lacceric acid, oleic acid, elaidic acid, linolic acid, linolenic acid, arachidonic acid, setoleic acid and elucic acid. A saturated fatty acid having 12 to 22 carbon atoms is preferred.

A homopolymer or copolymer of an alkylene glycol, having an average polymerization degree of not less than 16, is used as an alcohol from which the fatty acid ester is prepared. In particular, that having an average polymerization degree of 20 to 200 is preferable in view of the good surface of a resulting moulded article. For example, a polymer of an alkylene glycol, such as polyethylene glycol and polypropylene glycol, is used. A fatty acid ester to prepare from a fatty acid having 12 or more carbon atoms and a polyalkylene glycol having an average polymerization degree of 16 or more, for example, includes monolaurate, monopalmitate, monostearate, monobehenate, monomontanate, monooleate, monolinolate, dilaurate, dipalmitate, distearate, dibehenate, dimontanate, dioleate and dilinolate of a polyalkylene glycol such as polyethylene glycol and polypropylene glycol.

ACTIONS

When fatty acid esters of polyethylene-glycol having relatively small molecular weights which have hitherto been used or esters produced from fatty acids containing 11 or less carbon atoms or from polyethylene glycol having mean polymerization degrees 15 or lower are used, improvement in frictional characteristic of the products is recognized, but their other properties are not always adequate; the addition of these esters sometimes results in improper nipping when melting and kneading them, discoloration of resin or development of vent-up, thus detracting from stable extrusion. The products obtained show reduction in thermal stability or if molded products are left standing under high temperature and high humidity conditions, the additives sometimes bleed out to the surface of the molded products, causing their clouding; thus the solid matters which have bled out become recognizable as impaired surface appearance.

Contrary to that, the invention overcomes or remarkably diminishes the above discussed defects by use of the specific fatty acid ester. In addition, it provides excellent frictional characteristics and advantages in view of other properties and treatment.

An amount of the specific fatty acid ester to add to polyacetal resin according to the invention is from 0.01 to 30 percent by weight, based on the total weight of the composition. A preferable range of the addition is from 0.05 to 10 percent by weight. With smaller amounts than this, adequate friction characteristic sometimes can not be achieved, but larger amounts may invite reduced workability in extrusion molding or degradation in mechanical properties, etc. Preferably, they should be added in the range of 0.1 weight % to 5 weight %.

Stability of the compositions of this invention may be reinforced by further adding various well-known stabilizers. Or for improvement of physical properties according to their uses, various known additives may be further compounded. To illustrate, various coloring agents, lubricants, mold releasing agents, nucleating agents, surface active agents, organic high molecular improvers and fillers in the forms of fibers, powders, granules or plates of inorganic and organic compounds, metals, etc., may be used singly or in mixture of two or more of them.

The compositions of this invention may be readily prepared by any of the well-known methods which are commonly utilized as conventional techniques. For example, they include the method of preparing pellets by kneading in and extruding from an extruder the components which have been mixed, followed by molding, the method of mixing pellets differing in composition before molding and obtaining the compositions after molding, the method of directly charging in respective components at the time of molding, etc., whichever method is usable.

It should be noted that fatty acid esters may be added in the state of being borne by organic macromolecules or inorganic substances which serve as their retainers.

EFFECTS OF THE INVENTION

The polyacetal resin compositions of this invention composed as hereabove-described, as is apparent from the example described later, show excellent frictional characteristic, proper surface state of the molded products, without any loss of workability in extrusion and molding, and have well-balanced components, without any such inconveniences as degradation in other physical properties.

Although why the compositions of this invention can exhibit such effects is not distinct, the present inventor et al. suppose it to be a probable mechanism that the specified fatty acid esters have moderate affinity to polyacetal resin so that they properly seep out to the work surface when being molded or said esters moderately bleed to the sliding surface due to the evolution of heat from sliding, thereby forming a lubricant coating. With polyacetal resin compositions, etc., to which are added formerly proposed lubricants, for example, triglycerides or polymerized triglycerides, fatty acid amides or esters obtained from fatty acids and aliphatic alcohols, slipping of resin on the screw of the extruder occurs when kneading in the presence of such an additive and surging phenomenon, vent-up of unmolten resin through a vent hole or discoloration of resin and the like problems may arise and further, sometimes improper molding may result. It has been ascertained that with the specified fatty acid esters in the compositions of this invention, such a problem in extrusion molding is not recognized and that because of the larger molecular weights of polyalkylene glycols, as compared with conventional fatty acid esters, they excell in thermal stability and even if the molded product is left standing in conditions of high temperatures and high humidities, does not show such a disadvantage as excessive seeping-out at accelerated rates to the surface of the molded product, thereby impairing its outward appearance and functions. In these respects, an average polymerization degree of the polyalkylene glycol is preferably from 20 to 200.

EXAMPLE

In the following, an embodiment of this invention is described, but this invention will not be bound by such an embodiment.

Working and Comparison Examples

Stearic acid ester of polyethylene glycol shown in Table 1 was added to polyacetal resin, Duracon M90, a tradename of Polyplastics Co., Ltd., and a mixture was blended in a Henschel mixer. It was, then, molten and kneaded, using a 40 mm biaxial extruder, thereby preparing a pellet-form composition. Thereafter, test pieces were formed from the pellets by use of a extrusion molder and with them, various properties were measured. For comparison, the resin without the addition of the fatty acid ester of this invention and resin compositions with conventional lubricating property improvers added were similarly prepared and evaluated. Results are shown in Table-1. The measuring methods are as follows:

Measurement of Frictional Characteristic

The coefficient of dynamic friction as a frictional characteristic was measured after running a distance of 567 m against ABS resin at a 2.5 kg/cm$^2$ pressuring force, 3.9 cm/sec linear velocity and 2.0 cm$^2$ contact area, using a thrust type Suzuki friction and wear tester.

Surface Property of Molded Product

The test piece was left standing for 8 hours under conditions of temperature (80° C.) and humidity (85%) and thereafter, the temperature was brought back to the normal temperature, to visually observe how the additive has bled to the surface of the molded product. If excessive bleeding of liquid and powdery matters was found and any clouding of its surface or any adhering matters were recognized, the test piece was scored as "Bad".

Thermal Stability

Rate of weight reduction was measured after subjecting 5 g of resin composition to vacuum drying and, then, heating it in air at 230° C. for 45 min.

TABLE-1

| | Additive | | | | Physical properties | | Surface |
| --- | --- | --- | --- | --- | --- | --- | --- |
| | Name of additive | Amount added (wt. %) | Extrudability | Moldability | Coefficient of friction | Thermal stability | condition of molded product |
| Working examples | | | | | | | |
| 1 | Polyethylene-glycol-stearic-acid-ester*1 | 0.1 | Good | Good | 0.239 | 0.014 | Good |
| 2 | Polyethylene-glycol-stearic-acid-ester*1 | 0.5 | " | " | 0.227 | 0.023 | Good |
| 3 | Polyethylene-glycol-stearic-acid-ester*1 | 2.0 | " | " | 0.210 | 0.044 | Good |
| 4 | Polyethylene-glycol-stearic-acid-ester*1 | 3.0 | " | " | 0.206 | 0.047 | Good |
| 5 | Polyethylene-glycol-stearic-acid-ester*1 | 8.0 | " | " | 0.200 | 0.056 | Good |
| 6 | Polyethylene-glycol-stearic-acid-ester*2 | 0.5 | " | " | 0.226 | 0.024 | Good |

TABLE-1-continued

| | | Additive | | | | Physical properties | | Surface |
| | Name of additive | Amount added (wt. %) | Extrudability | Moldability | Coefficient of friction | Thermal stability | condition of molded product |
|---|---|---|---|---|---|---|---|
| 7 | Polyethylene-glycol-stearic-acid-ester*2 | 2.0 | " | " | 0.212 | 0.046 | Good |
| Comparison examples | | | | | | | |
| 1 | — | — | Good | Good | 0.307 | 0.009 | Good |
| 2 | Palmitinic acid triglyceride | 0.5 | Rather bad** | Bad*** | 0.243 | 0.018 | Bad |
| 3 | Palmitinic acid triglyceride | 2.0 | Bad** | " | 0.240 | 0.026 | Bad |
| 4 | Hydroxystearic-acid-triglyceride | 2.0 | Bad** | " | 0.228 | 0.016 | Bad |
| 5 | Polymerized stearic-acid-triglyceride | 2.0 | Bad** Discoloration heavy | " | 0.260 | 0.061 | Bad |
| 6 | Ethylene-bis-stearyl-amid | 2.0 | Bad** Discoloration heavy | " | 0.250 | 0.018 | Bad |
| 7 | RCOOR'*4 | 2.0 | Bad** | " | 0.242 | 0.023 | Bad |
| 8 | Polyethylene-glycol-stearic-acid-ester*3 | 0.5 | Rather bad** | Good | 0.242 | 0.042 | Bad |
| 9 | Polyethylene-glycol-stearic-acid-ester*3 | 2.0 | " | " | 0.227 | 0.065 | Bad |

*1Nonion S-40 Manufactured by Nihon Yushi Co., Ltd. (Mean polymerization degree of polyethylene-glycol 90)
*2Nonion S-15.4 Manufactured by Nihon Yushi Co., Ltd. (Mean polymerization degree of polyethylene-glycol 35)
*3Nonion S-4 Manufactured by Nihon Yushi Co., Ltd. (Mean polymerization degree of polyethylene-glycol 9)
*4Ester of R = $C_{25}$ and R' = $C_{30}$
(Note)
The amount added is represented by % by weight on the basis of the total weight of the composition
**Unmolten or half-molten resin causes vent-up.
***Pellets slip on the screw of the molder, causing improper nipping.

The embodiments of the invention in which an exclusive property or privilege is claimed are defined as follows:

1. A polyacetal resin composition which comprises a blend of the following individual components:
   (a) polyacetal; and
   (b) an ester of a fatty acid having 12 or more carbon atoms and a polyalkylene glycol having an average polymerization degree of 16 or more.

2. A polyacetal resin composition as claimed in claim 1, which comprises 0.01 to 30 percent by weight of said ester.

3. A polyacetal resin composition as claimed in claim 1, in which the fatty acid has 12 to 22 carbon atoms and the polyalkylene glycol has a polymerization degree of 16 to 200 on the average.

4. A polyacetal resin composition as claimed in claim 1, in which the ester is mono-ester or di-ester.

5. A polyacetal resin composition as claimed in claim 1, in which the polyalkylene glycol has ethylene units or propylene units as the polyalkylene group.

6. A polyacetal resin composition as claimed in claim 1, in which the polyalkylene glycol has an average polymerization degree of 20 to 200.

7. A polyacetal resin composition as claimed in claim 2, which comprises 0.05 to 10 percent by weight of said ester.

8. A polyacetal resin composition as claimed in claim 7, which comprises 0.1 to 5 percent by weight of said ester.

* * * * *